United States Patent [19]

Audykowski

[11] 4,108,815

[45] Aug. 22, 1978

[54] HEAT-CURABLE LACQUER OF LOW SOLVENT CONTENT, BASED ON AN EPOXIDE RESIN

[75] Inventor: Thaddeus Audykowski, Basel, Switzerland

[73] Assignee: Ciba-Geigy Corporation, Ardsley, N.Y.

[21] Appl. No.: 601,963

[22] Filed: Aug. 4, 1975

[30] Foreign Application Priority Data

Aug. 16, 1974 [CH] Switzerland ................. 11256/74

[51] Int. Cl.² ................. C08K 5/09; C08K 5/10; C08L 63/00
[52] U.S. Cl. ................. 260/29.2 EP; 260/29.1 R; 260/29.2 E; 260/29.3; 260/29.4 R; 260/30.2; 260/31.2 R; 260/31.2 N; 260/31.2 T; 260/31.2 XA; 260/32.2
[58] Field of Search ............ 260/31.4 R, 31.4 EP, 260/29.2 EP, 33.4 EP, 29.3, 29.4 R, 29.2 N, 29.2 E, 29.1 R, 30.2, 31.2 R, 31.2 XA, 31.2 N, 31.2 T, 33.6 EP, 32.2

[56] References Cited

U.S. PATENT DOCUMENTS

| | | | |
|---|---|---|---|
| 3,454,418 | 7/1969 | Forsberg | 260/33.4 EP |
| 3,642,938 | 2/1972 | Schmid et al. | 260/33.4 EP |
| 3,650,997 | 3/1972 | Weisfeld et al. | 260/33.2 EP |
| 3,772,228 | 11/1973 | Allen | 260/29.2 EP |
| 3,847,849 | 11/1974 | Lackner | 260/29.2 EP |

FOREIGN PATENT DOCUMENTS 1,302,013 9/1969 Fed. Rep. of Germany.

*Primary Examiner*—Allan Lieberman
*Attorney, Agent, or Firm*—Vincent J. Cavalieri

[57] ABSTRACT

A heat-curable lacquer containing a compound having glycidyl groups and a concentrated solution of an organic tetracarboxylic acid or the dianhydride thereof. The lacquer can be used for the manufacture of coatings on tin cans, packages, glass bottles and tubes, and of coil coatings.

15 Claims, No Drawings

HEAT-CURABLE LACQUER OF LOW SOLVENT CONTENT, BASED ON AN EPOXIDE RESIN

The subject of the invention is a heat-curable lacquer of low solvent content, based on an epoxide resin and the use thereof for the manufacture of coatings on tin cans, packages, glass bottles and tubes, and of coil coatings.

The lacquer-processing industries are changing over increasingly to the use of lacquers without organic solvents, for example powder lacquers, or lacquers containing as little solvent as possible, for reasons of economy and protection of the environment. Examples of lacquer systems of this kind are known from U.S. Pat. No. 3,265,646 and German Offenlegungsschrift 2,019,282.

The U.S. Patent describes resin mixtures which contain esters of certain polyols with monocarboxylic acids which in part contain epoxide groups, polyglycidyl ethers based on certain aliphatic or aromatic polyols, and certain hydrogenated phthalic anhydrides. The viscosity of such lacquers is low and their storage stability is good. The cured coatings are flexible, impact-resistant and resistant to water, salts, solvents and alkalis and have a good adhesion. However, in view of the evaporation losses of monoanhydride, the long stoving time which must be employed has a disadvantageous effect, particularly in the manufacture of thin coatings, such as about 5–10 μm.

The German Offenlegungsschrift relates to coating agents which contain aminoplasts and bifunctional esters as the binder. The coatings achieved by means of these agents combine high elasticity and good hardness. However, the coatings are only slightly crosslinked, which manifests itself in their low resistance to acetone and to acid and alkaline media. The requirements which are set for lacquers for the canning industry, for example in respect of resistance to pasteurisation (½ hour at 70° C), resistance to sterilisation (1 hour at 120° C) and resistance to dilute organic acids, are not met.

It has now been found that coatings which do not have the abovementioned disadvantages can be manufactured with the aid of a lacquer system according to the present invention.

The heat-curable lacquer of low solvent content, according to the invention, is characterised in that it contains a compound having two or more glycidyl groups, and a concentrated solution of an organic tetracarboxylic acid or the dianhydride thereof. The quantities of the two constituents of the lacquer can vary between 10–90 percent by weight to 90–10 percent by weight.

The lacquer can additionally contain other substances, such as a phenol resin, for example based on bisphenol A and formaldehyde, or phenol/formaldehyde, an amino resin, preferably hexamethoxymethyl-melamine or a methylated ureaformaldehyde resin, or a liquid or solid polyester which contains hydroxyl groups. These additives are preferably present in quantities of 5–80 percent by weight, relative to the total lacquer.

Furthermore, the lacquer can contain an accelerator, such as, for example, a thio compound, or, particularly in an aqueous lacquer system, concentrated phosphoric acid or p-toluenesulphonic acid. The quantities of such accelerators vary within quantities of 0.2–2 percent by weight, relative to the total quantity of the lacquer less the quantity of volatile solvent.

An addition of a phenol resin produces, above all, outstanding properties from the point of view of lacquer technology, for example resistance to sterilisation, and an improved resistance of the cured coatings to acids. It is preferable to use a lacquer which contains an aqueous solution of a tetracarboxylic acid as the additional curing agent and phosphoric acid as the accelerator. The quantities of the components used in this lacquer can vary, for example as follows (percentage data relate to the weight and to the total quantity of binder in the lacquer):

30–50% of a polyglycidyl compound,
30–20% of an additional epoxide resin which confers flexibility and of a suitable monofunctional or bifunctional reaction diluent which contains epoxide groups,
30–20% of a phenol resin, if appropriate pre-dissolved in the reaction diluent,
10% of an aqueous solution of tetracarboxylic acid and
0.5–2% of phosphoric acid.

Possible polyglycidyl compounds are primarily diglycidyl compounds of aliphatic, cycloaliphatic, aromatic or heterocyclic building blocks, such as diols or dicarboxylic acids. Examples which may be mentioned are polyglycidyl ethers of polyhydric alipatic alcohols, such as 1,4-butanediol, neopentyl glycol and pentaerythritol, or polyalkylene glycols, such as polypropylene glycols, polyglycidyl ethers of cycloaliphatic polyols, such as 2,2-bis-(4-hydroxycyclohexyl)-propane or 2,2,6,6-tetrahydroxymethyl-cyclohexanol, polyglycidyl ethers of polyhydric phenols, such as resorcinol, bisphenol A, hydrogenated bisphenol A and bisphenol F, bis-(p-hydroxyphenyl)-methane and 1,1,2,2-tetrakis-(p-hydroxyphenyl)-ethane, and of condensation products of phenols and formaldehyde which are obtained under acid conditions, such as phenolnovolacs or cresolnovolacs.

Examples of possible polyglycidyl esters are those of polybasic aromatic carboxylic acids, such as phthalic acid or terephthalic acid, of aliphatic carboxylic acids, such as sebacic acid or adipic acid or methyl-substituted derivatives thereof, and of cycloaliphatic polycarboxylic acids, such as tetrahydrophthalic acid or hexahydrophthalic acid or cyclo-hexanone-2,2,6,6-tetrapropionic acid.

Other polyglycidyl compounds which are preferentially used are derived from compounds containing hydantoin groups, such as those of the formula I

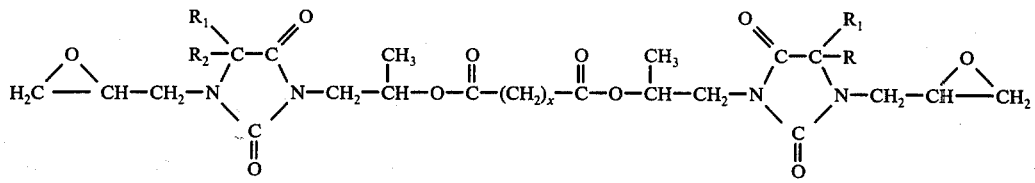

wherein x = 4–12, particularly the sebacic acid or azelaic acid group less the two carboxyl groups, or the corresponding radical of adipic acid, and $R_1$ and $R_2$ each denote a methyl or ethyl group or conjointly also denote the tetramethylene or pentamethylene group, particularly a methyl group in each case. Triglycidyl compounds of the formula II

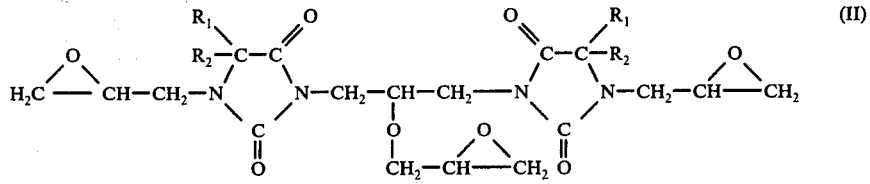

wherein $R_1$ and $R_2$ have the same meanings as in formula I, can also be used.

It is also possible to employ mixtures of various polyglycidyl compounds, some of which can have an action conferring flexibility, such as, for example, a mixture of 1,3-diglycidyl-5,5-dimethylhydantoin and 2-($\alpha,\alpha$-dimethyl-$\beta$-glycidyloxyethyl)-4-(glycidyloxybutyl)-1,3-dioxolane.

Instead of the hydantoin compound mentioned, it is also possible to use the corresponding diglycidyl compound which is substituted in the 5-position of the hydantoin ring by ethyl groups, a methyl group and an ethyl group or by a tetramethylene or pentamethylene group. Other mixtures consist of one of the diglycidylhydantoin compounds mentioned and trimethyladipic acid diglycidyl ester.

Examples of curing agents which can be employed are the following tetracarboxylic acids or dianhydrides thereof: compounds having 2 phthalic acid, tetrahydrophthalic acid or hexahydrophthalic acid groups linked via a connecting member, such as alkylene, or compounds which contain 2 trimellitic acid groups, esterified with a polyol, such as, in particular, 4,4'-(2-acetoxy-1,3-glyceryl) di-anhydrotrimellitate.

The curing agents, which are solid substances, must be soluble in organic solvents or water in quantities such that concentrated solutions, preferably at least 50% strength solutions, can be prepared. The less soluble the curing agent, the less suitable it is as a lacquer constituent, such as, for example, benzophenonetetracarboxylic acid dianhydride, cyclopentanetetracarboxylic acid dianhydride or pyromellitic acid dianhydride. The reactivity of such curing agents can also influence the film properties (see Examples 16-18).

Solvents which can be used for the dianhydride compounds are preferably chemical compounds or mixtures thereof which are not photo-reactive and which cause little environmental pollution, such as esters, for example butyl acetate, methylglycol acetate or ethylglycol acetate, and also - when using tetracarboxylic acid - water. N-Methyl-2-pyrrolidone is particularly suitable for sparingly soluble dianhydrides. Butyrolactone and dimethylformamide are not such good solvents. The solutions preferably have a concentration of 50-95 percent by weight of the dianhydride compound, preferably 80-95 percent by weight.

The lacquer according to the invention can be used, in a clear or pigmented state, as an outer or inner coating in the manufacture of tin cans, packages, glass bottles and tubes, and also for coil coatings and similar coatings or in sectors of industrial lacquering.

When lacquers containing hydantoin groups are used, coatings are obtained which have particularly good fastness to weathering and light and gloss retention, and which are particularly suitable for coil coatings and water-white protective coatings for glass bottles.

The lacquers are applied by customary processes which are known in lacquering shops, particularly application by roller and spraying.

EXAMPLES 1. 350 g of trimethyladipic acid diglycidyl ester are mixed with 350 g of a liquid polyester as described below and 150 g of hexamethoxymethyl-melamine and 5 g of a silicone resin as a flow control agent. A solution of 120 g of a product from the reaction of 2 mols of trimellitic anhydride with 1 mol of triacetin, called "dianhydride" for short, in 80 g of ethylglycol acetate is stirred into this mixture. This gives a water-white mixture of low viscosity containing 7.5% by weight of solvent. The viscosity is 300 cP initially and 1,200 cP after 2 days at 25° C.

The lacquer can be applied in the customary manner to aluminium or tin plate or metal tapes or to the exterior or interior walls of tin cans by rolling or spraying and can be cured in the course of 10 minutes at elevated temperature, for example 150° – 220° C. The coating has an outstanding elasticity, resistance to acid, resistance to boiling water, resistance to heat and resistance to yellowing.

PREPARATION OF THE POLYESTER

A mixture of 65.1 g of ethylene glycol (1.05 mols), 79.8 g of propane-1,2-diol (1.05 mols), 74 g of phthalic anhydride (0.5 mol) and 73 g of adipic acid (0.5 mol) is heated in accordance with the following time-temperature programme, while stirring and passing a gentle stream of nitrogen through the mixture: 2 hours at 140° C, 2 hours at 160° C, 4 hours at 180° C, 4 hours at 190° C and 4 hours at 200° C. During this time a total of 25 ml of water are separated off. The clear, colourles ester mixture has an acid number of 2.5 mg of KOH/g and a hydroxyl number of 454 mg of KOH/g, which corresponds to an average molecular weight of 245.

The reaction product designated as "dianhydride" consists essentially of 4,4'-(2-acetoxy-1,3-glyceryl) bis-anhydrotrimellitate of the formula III

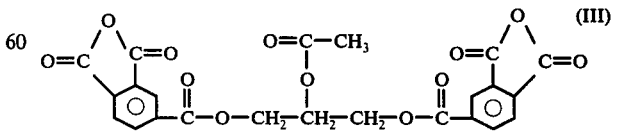

2. The following constituents are mixed to form a lacquer in the same way as in Example 1:
350 g of trimethyladipic acid diglycidyl ester,
350 g of a diglycidyl compound of the formula IV

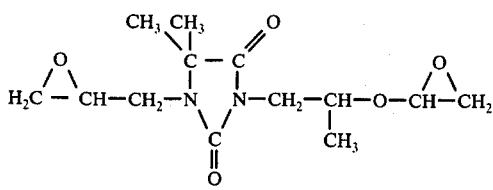

150 g of hexamethoxymethyl-melamine,
5 g of silicone resin (60% strength solution in toluene) and
120 g of "dianhydride" in
80 g of ethylglycol acetate.

The water-white mixture has a viscosity of about 500 cP. It contains 7.5% by weight of solvent and, on lacquering, gives coatings which are of a similar good quality but chemically even more resistant than the lacquer of Example 1.

3. 370 g of a cyclic acetal of 2-epoxypropoxypivalaldehyde of the formula V

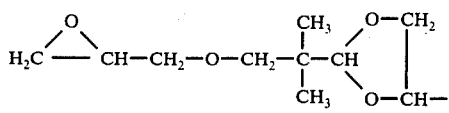 

are mixed, as in Example 1, with
50 g of hexamethoxymethyl-melamine,
5 g of silicone resin (60% strength) and
190 g of "dianhydride" dissolved in
60 g of ethylglycol acetate.

This gives a water-white liquid having a viscosity at 25° C of 540 cP and of 1,600 cP after 2 days.

It can be applied, like the lacquers described in the preceding examples, to form similarly good coatings.

4. 493 g of trimethyladipic acid diglycidyl ester are mixed with 405 g of "dianhydride" dissolved in 102 g of ethylglycol acetate.

The mixture, which contains 10.2% by weight of solvent, has a viscosity at 25° C of about 1,180 cP.

It can be used as a lacquer just as well as described in Example 1.

5. 500 g of trimethyladipic acid diglycidyl ester are mixed with 250 g of a liquid, linear polyester (a condensation product of ethylene glycol with adipic acid) and 250 g of hexamethoxymethyl-melamine. A solution of 200 g of "dianhydride" in 50 g of ethylglycol acetate is stirred into this mixture.

The water-white mixture contains 4% by weight of solvent and has a viscosity at 25° C of 500 cP and of 1,500 cP after 2 days.

The coatings produced using this lacquer exhibit properties which are of a similar good quality to those described in Example 1.

6. 850 g of polypropylene glycol diglycidyl ether (the polypropylene glycol on which this compound is based having an average molecular weight of 425) are mixed with 150 g of hexamethoxymethyl-melamine and a solution of 160 g of "dianhydride" in 40 g of ethylglycol acetate.

The resulting water-clear mixture which contains 6% of solvent, has a viscosity at 25° C of 25 cP and of 320 cP after 2 days.

The coatings produced therewith exhibit properties which are of a similar good quality to those obtained using the lacquer described in Example 1.

7. 900 g of the diglycidyl ester of a condensation product of 2 mols of phthalic anhydride and 1 mol of polypropylene glycol having an average molecular weight of 425, are mixed with 100 g of hexamethoxymethyl-melamine. A solution of 160 g of "dianhydride" in 40 g of ethylglycol acetate is added to the mixture.

A water-clear mixture contains 12% of solvent and has a viscosity of 1,700 cP; after 2 days this viscosity is 3,350 cP.

The coatings produced using this lacquer are of a similar good quality to those produced using the lacquer described in Example 1.

8. 400 g of the diglycidyl ester used in Example 7 are mixed with 300 g of trimethyladipic acid diglycidyl ester, 5 g of a silicone resin (60% strength solution), 150 g, dissolved in 150 g of butanol, of a phenolic resin based on bisphenol A and formaldehyde, 50 g of ethyl alcohol and 5 g of concentrated phosphoric acid. A solution of 100 g of "dianhydride" in 100 g of water (the tetracarboxylic acid of the "dianhydride" being the predominant product in this solution) are added to the mixture.

The mixture is water-clear, contains 24% of solvent and has a viscosity at 25° C of 155 cP. After 2 days the viscosity is 500 cP.

Coatings which are just as good as those produced using the lacquer described in Example 1 can be produced using this mixture. The properties concerning lacquer technology, such as resistance to sterilisation, and the resistance to acid, are even better.

9. 400 g of diglycidyl ester of the formula IV (compare Example 2) are mixed with 300 g of 2-(α,α-dimethyl-β-glycidyloxyethyl)-4-(glycidyloxybutyl)-1,3-dioxolane (compare formula V in Example 3), 5 g of silicone resin (60% strength solution), 400 g of the same phenolic resin solution as in Example 8 and 10 g of concentrated phosphoric acid. An aqueous solution of the tetracarboxylic acid derived from 100 g of "dianhydride" in 100 g of $H_2O$ is added to this mixture. The clear mixture, which has a viscosity at 25° C of 185 cP and a viscosity of 1,080 cP after 2 days, and contains 22% of water-solvent mixture, produces coatings of a similar good quality to those produced using the lacquer described in Example 8.

10. 400 g of 4,4'-diglycidyloxy-dicyclohexylmethane are mixed with 350 g of the resin of formula V (compare Example 3), 400 g of the phenolic resin solution used in Example 8, 5 g of a silicone resin (60% strength solution) and 10 g of concentrated phosphoric acid. An aqueous solution of the tetracarboxylic acid derived from 100 g of "dianhydride" in 100 g of water is added to this mixture.

The clear mixture has a viscosity at 25° C of 240 cP and has a viscosity of 3,000 cP after 2 days. It contains about 22% of volatilisable water. Coatings of a similar good quality to those produced using the lacquer described in Example 8 can be produced using the mixture and the resistance to acid is extremely good.

11. 630 g of 4,4'-diglycidyloxy-dicyclohexylmethane are mixed with 406 g of trimethyladipic acid diglycidyl ester. 100 g of this mixture are stirred with 65 g of "dianhydride" in 40 g of ethylglycol acetate and with 3 g of thiodiethylene glycol (as the accelerator) and 5 g of silicone resin (60% strength solution).

The mixture prepared in this way has a viscosity of 87 cP, rising to 4,000 cP after 24 hours. It contains 20% by weight of volatile solvent. Coatings having similar good properties to those of the coating described in Example 1 are obtained on curing, for ½ hour at 120° C or for 15 minutes at 150° C, the coating produced using this lacquer. The lacquer has the advantage that it cures completely at a lower temperature.

12. 60 g of trimethyladipic acid diglycidyl ester are mixed with 20 g of the diglycidyl compound of the formula IV (compare Example 2) and 20 g of 4,4'-diglycidyloxydicyclohexylmethane. The mixture is stirred with 72.5 g of "dianhydride", dissolved in 48.5 g of ethylglycol acetate, and 3 g of thiodiethylene glycol and 4 g of silicone resin solution (60% strength).

The mixture has a viscosity of 111 cP and a viscosity of 3,450 cP after 24 hours. It contains 21% of volatile solvent. Good coatings, as described in Example 11, are also obtained using this lacquer.

13. 400 g of 2,2,6,6-tetraglycidyloxymethyl-cyclohexanol, 350 g of 2-($\alpha,\alpha$-dimethyl-$\beta$-glycidyloxyethyl)-4-(glycidyloxybutyl)-1,3-dioxolane (compare formula V in Example 3), 400 g of the phenolic resin solution used in Example 8 and 5 g of a silicone resin (60% strength solution) are mixed together. 200 g of a solution of 100 g of "dianhydride" in 100 g of water, and 10 g of concentrated phosphoric acid, are added to this mixture.

Solid coatings, as described in Example 1, are also achieved using this lacquer.

14. Instead of 2,2,6,6-tetraglycidyloxymethyl-cyclohexanol, 400 g of a pentaerythritol glycidyl ether containing on average 3 to 4 glycidyl groups are mixed with the remaining components as in Example 13.

This gives a lacquer similar to that described in Example 13, which can be cured to give similarly good coatings.

15. The procedure of Example 13 is followed, but using 400 g of cyclohexanone-2,2,6,6-tetrapropionic acid glycidyl ester instead of 2,2,6,6-tetraglycidyloxymethyl-cyclohexanol.

Coatings having good properties are also obtained using this lacquer.

16. The procedure of Example 1 is followed, but using 152 g of a 50% strength solution of benzophenone-tetracarboxylic dianhydride in N-methyl-2-pyrrolidone instead of 200 g of a "dianhydride" solution. At a solids content of 92.4%, the yellowish solution has an initial viscosity at 25° C of 640 cps, which, after 24 hours, has risen to 1,490 cps. After curing for 10 minutes at 200° C at a film thickness of 10 μm, this lacquer produces flexible films which are just as good as those in Example 1. However, they have a poorer resistance to acetone and to hot water and a somewhat lower resistance to acid. Benzophenonetetracarboxylic dianhydride has a tendency to crystallise out after approx. 24 hours.

17. The procedure of Examples 1 and 16 is followed, but using 100 g of a 50% strength solution of cyclopentanetetracarboxylic dianhydride, dissolved in N-methyl-2-pyrrolidone, as the secondary curing agent. At a solids content of 92% the light-yellowish lacquer solution has an initial viscosity at 25° C of 400 cps, which, after 24 hours, rises only very slightly to 410 cps. Lacquer films cured in a similar manner have mechanical lacquer properties similar to those in Example 16, but a slightly lower resistance to acid.

18. The procedure of Example 17 is followed, but using 102 g of a 50% strength solution of pyromellitic anhydride, dissolved in N-methyl-2-pyrrolidone or dimethylformamide, as the curing agent. A lacquer solution of this kind can only be dissolved to give a clear solution if heated at about 70° C, and after cooling to 20°–25° C pyromellitic anhydride crystallises out from the lacquer solution after only 2–2½ hours. At a solids content of 92%, the viscosity at 25° C is initially approx. 290 cps and is approx. 340 cps after 24 hours. The mechanical film properties and the resistance to chemicals, particularly the resistance to acid, are very similar to those of the films of Examples 16 and 17.

19. Glycidyl esters containing hydantoin groups (compare formula I), if appropriate in combination with butanediol glycidyl ether as the reactive diluent, can be used as the polyglycidyl compounds which have been plasticised. They produce, particularly in higher film thicknesses of up to 50–75 μm, films which are much harder and yet more flexible and more resistant to alkali. Such combinations are particularly suitable for the protective lacquering of glass bottles and for coil coating lacquers of high plasticity.

Formulation:
  400 g of the liquid polyester according to Example 1,
  200 g of the heterocyclic polyglycidyl compound of the formula I wherein $x = 8$ and $R_1$ and $R_2$ each denote methyl,
  150 g of 1,4-butanediol glycidyl ether,
  150 g of hexamethoxymethyl-melamine resin and
  200 g of "dianhydride" solution (70% strength in ethylglycol acetate).

Similar properties in respect of the lacquering of glass bottles are obtained if a cycloaliphatic polyglycidyl ether based on hydrogenated bisphenol A or tetrahydrophthalic acid diglycidyl ester is used instead of the heterocyclic polyglycidyl ester.

20. 300 g of a liquid epoxide resin having functional hydroxyl group and prepared from 2 mols of 1,4-butanediol glycidyl ether and 1 mol of bisphenol A (epoxide content/kg = 3.2, viscosity at 25° C approx. 13,000 cps) are mixed with 200 g of cyclohexanone-2,2,6,6-tetrapropionic acid glycidyl ester (epoxide content/kg 5.9, viscosity at 25° C about 16,000 cps) and 300 g of a very flexible epoxide resin of low viscosity, based on a cyclic acetal of the formula V, and, before being applied, the mixture is combined with a curing component consisting of 150–250 g of a conventional solid phenolic resin dissolved in a reactive diluent or an organic solvent. 10–20 g of concentrated phosphoric acid are used as the catalyst together with 200 g of "dianhydride" solution (50% strength in water) as in Example 8. At a solids content of 80%, the clear lacquer solution has a stability of about 2–8 weeks, and, after stoving at 190°–205° C for 10 minutes, gives high-grade lacquer films which are very suitable for internal protective coatings, at film thicknesses of 7–12 μm.

21. 400 g of a resol glycidyl ether of low viscosity (epoxide content/kg = 6.8, viscosity at 25° C about 290 cps) are mixed with 150 g of a flexible epoxide resin consisting of a mixture of 80% of the diglycidyl ester of Example 7 and 20% of bisphenol A diglycidyl ether. Before application, this stable resin mixture is combined with 250 g of a solid, conventional phenolic resin, produced by alkaline or acid condensation, which is dissolved in 200 g of a reactive diluent based on a glycidyl ester of tertiary carboxylic acids and 200 g of methylglycol acetate. This lacquer solution is catalysed with 5-10 g of concentrated phosphoric acid. At a solids content of 82%, the stability of this lacquer of low solvent content is about 2 months. The properties of the films regarding lacquer technology are similar to those in Example 20.

22. 400 g of a liquid cycloaliphatic epoxide resin of low viscosity, based on hydrogenated bisphenol A (epoxide content/kg = 4.4, viscosity at 25° C equal to ≦ 2,500 cps), are mixed with 350 g of a flexible epoxide compound of low viscosity of the formula V (epoxide content/kg = 4.65, viscosity at 20° C = approx. 120 cps). 400 g of a phenolic resin solution (as in Example 8) which has been combined with 200 g of "dianhydride" solution (50% strength in water) and 5-20 g of concentrated phosphoric acid, are used as the curing component. The stability of this lacquer solution of about 80% strength is several days. It gives highly flexible lacquer coatings which have extremely good wetting and levelling properties and which, under the customary stoving conditions of 10-15 minutes at 180°-205° C, are distinguished by stability under sterilisation and good resistance to boiling, dilute solutions of organic acids.

What I claim is:

1. A heat-curable lacquer of low solvent content, characterized in that it contains
   (A) from 90-10% by weight of a compound having two or more glycidyl groups; and
   (B) from 10-90% by weight of a solution containing 50-95% by weight of 4,4'-(2-acetoxy-1,3-glyceryl)-di-anhydrotrimellitate or the corresponding tetracarboxylic acid of said di-anhydrotrimellitate.

2. A lacquer according to claim 1 characterized in that component (B) is an organic solvent containing 4,4'-(2-acetoxy-1,3-glyceryl)di-anhydrotrimellitate or the corresponding tetracarboxylic acid of said di-anhydrotrimellitate.

3. A lacquer according to claim 1 characterized in that component (B) is water containing the tetracarboxylic acid of 4,4'-(2-acetoxy-1,3-glyceryl)di-anhydrotrimellitate.

4. Lacquer according to claim 1, characterised in that it additionally contains 5 to 80% by weight of a liquid or solid polyester, containing hydroxyl groups, an amino resin or a phenol resin.

5. Lacquer according to claim 2, characterised in that it additionally contains a thio compound as the accelerator.

6. Lacquer according to claim 3, characterised in that it additionally contains phosphoric acid as the accelerator.

7. Lacquer according to claim 4, characterised in that it contains hexamethoxymethylmelamine as the amino resin.

8. Lacquer according to claim 4, characterised in that it contains a methylated urea-formaldehyde resin as the amino resin.

9. Lacquer according to claim 1, characterised in that it contains a diglycidyl ether and/or diglycidyl ester as (A).

10. Lacquer according to claim 9, characterised in that it contains trimethyladipic acid diglycidyl ester as (A).

11. Lacquer according to claim 9, characterised in that it contains a liquid diglycidylhydantoin compound of the formula I

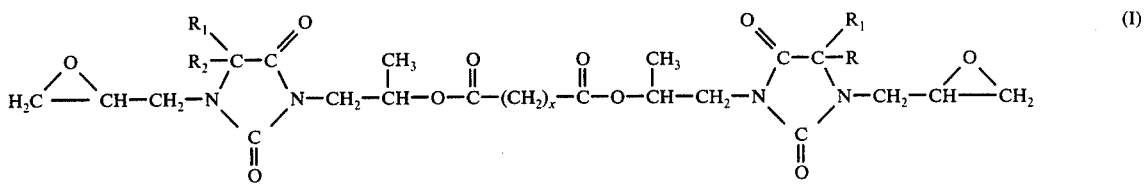

wherein $x = 4-12$ and $R_1$ and $R_2$ each denote the methyl or ethyl group or conjointly also denote the tetramethylene or pentamethylene group, as (A).

12. Lacquer according to claim 11, characterised in that it contains a compound of the formula I wherein $x = 8$ and $R_1$ and $R_2$ each denote the methyl group.

13. Lacquer according to claim 11, characterised in that it contains a compound of the formula I wherein $x = 7$ and $R_1$ and $R_2$ each denote the methyl group.

14. Lacquer according to claim 1, characterised in that it contains trimethyladipic acid diglycidyl ester and a liquid 1,3-diglycidylhydantoin compound which is substituted in the 5-position by methyl groups and/or ethyl groups or by a tetramethylene or pentamethylene group, as (A).

15. Lacquer according to claim 1, characterised in that it contains a mixture of 1,3-diglycidylhydantoin which is substituted in the 5-position by methyl groups and/or ethyl groups or by a tetramethylene or pentamethylene group, and of 2-(α,α-dimethyl-β-glycidyloxyethyl)-4-(glycidyloxybutyl)-1,3-dioxolane, as (A).

* * * * *